United States Patent
Lemarchand et al.

(10) Patent No.: US 10,246,021 B2
(45) Date of Patent: Apr. 2, 2019

(54) FORMING OF A MAP POCKET FOR A MOTOR VEHICLE SEAT

(71) Applicant: FAURECIA SIEGES D'AUTOMOBILE, Nanterre (FR)

(72) Inventors: Robert Lemarchand, Champigny sur Marne (FR); Jean-Yves Piederriere, Angerville (FR); Philippe Bourde, Echenoz-la-Meline (FR)

(73) Assignee: FAURECIA SIEGES D'AUTOMOBILE, Nanterre (FR)

( * ) Notice: Subject to any disclaimer, the term of this patent is extended or adjusted under 35 U.S.C. 154(b) by 187 days.

(21) Appl. No.: 15/166,180

(22) Filed: May 26, 2016

(65) Prior Publication Data

US 2016/0375834 A1    Dec. 29, 2016

(30) Foreign Application Priority Data

Jun. 29, 2015 (FR) ..................... 15 56085

(51) Int. Cl.
| | |
|---|---|
| *B60R 7/08* | (2006.01) |
| *B60N 2/58* | (2006.01) |
| *B60R 7/00* | (2006.01) |
| *B60R 13/02* | (2006.01) |

(52) U.S. Cl.
CPC ............... *B60R 7/005* (2013.01); *B60N 2/58* (2013.01); *B60R 7/081* (2013.01); *B60R 13/0243* (2013.01)

(58) Field of Classification Search
CPC ........... B60R 7/081; B60R 7/005; B60N 2/58; B60N 2/60

USPC ..................................................... 297/188.04
See application file for complete search history.

(56) References Cited

U.S. PATENT DOCUMENTS

| | | | | |
|---|---|---|---|---|
| 5,004,295 | A * | 4/1991 | Inoue ....................... | B60N 2/44 297/188.07 |
| 5,292,174 | A * | 3/1994 | Ohnuma ................ | B60R 7/043 297/188.06 |
| 6,682,115 | B1 * | 1/2004 | Tiesler .................... | B60R 7/005 224/483 |
| 7,008,154 | B1 * | 3/2006 | Nolle ...................... | B60R 7/005 410/118 |
| 9,457,731 | B2 * | 10/2016 | Narayanan .............. | B60R 11/02 |
| 9,573,528 | B1 * | 2/2017 | Line ........................ | B60R 7/005 |
| 2003/0155796 | A1 * | 8/2003 | DePaulis .................. | B60N 2/60 297/229 |

(Continued)

FOREIGN PATENT DOCUMENTS

| | | |
|---|---|---|
| DE | 202004018946 U1 | 4/2006 |
| FR | 2990659 A1 | 11/2013 |

(Continued)

OTHER PUBLICATIONS

Preliminary Search Report in French Patent Application No. 1556085, dated Apr. 22, 2016, 2 pages.

*Primary Examiner* — Timothy J Brindley
(74) *Attorney, Agent, or Firm* — Moreno IP Law LLC

(57) ABSTRACT

A map pocket for a motor vehicle cover element formed of a stack formed at least of a cover material made of textile, of leather, of skin, or of a synthetic material, and of a foam layer at the rear surface of the covering material, including: a piece defining the apparent surface of the pocket; elongated rigid elements at least partially surrounding said piece and sandwiching the cover element and said piece.

8 Claims, 4 Drawing Sheets

(56) References Cited

U.S. PATENT DOCUMENTS

| | | | | |
|---|---|---|---|---|
| 2008/0252111 | A1* | 10/2008 | Rothkop | B60N 3/004 297/188.04 |
| 2010/0102601 | A1* | 4/2010 | Yasuda | B60N 2/58 297/188.04 |
| 2010/0148551 | A1* | 6/2010 | Nguyen | B60N 2/5825 297/218.3 |
| 2011/0198896 | A1* | 8/2011 | Brinster | B60R 7/005 297/188.06 |
| 2013/0249269 | A1* | 9/2013 | Sasaki | B60N 2/5825 297/452.18 |
| 2014/0062147 | A1* | 3/2014 | Bashir | B60R 7/005 297/188.01 |
| 2015/0035325 | A1* | 2/2015 | Gagnier | B60N 2/58 297/188.04 |
| 2015/0165947 | A1* | 6/2015 | Clauser | B60N 2/5825 297/452.18 |
| 2016/0137138 | A1* | 5/2016 | Dyle | B60N 2/58 297/188.04 |
| 2016/0176350 | A1* | 6/2016 | Abe | B60R 7/005 297/188.04 |
| 2017/0282759 | A1* | 10/2017 | Line | B60N 2/20 |

FOREIGN PATENT DOCUMENTS

| | | | | |
|---|---|---|---|---|
| JP | 2011004841 | A | * | 1/2011 |
| JP | 2017100623 | A | * | 6/2017 |

* cited by examiner

FORMING OF A MAP POCKET FOR A MOTOR VEHICLE SEAT

BACKGROUND

The present disclosure generally relates to motor vehicles and, more particularly, to the forming of a pocket in a cover element for a seat element (rear panel of a backrest, lateral seat hood) or for the interior of a vehicle (door panel). The present disclosure more specifically relates to the forming of a pocket in a cover element having its rear surface comprising a foam layer.

DISCUSSION OF PRIOR ART

Rear panels of motor vehicle seats and lateral casings are usually formed by plastic injection parts, covered sheet metal, a stretched lining attached to the metallic structure of the seat via plastic profiles, or also by the use of a plastic frame attached to the metallic structure or assembled with the cap of the upholstery of the front surface of the seat.

A specific category of rear panels to which the present description applies comprises a foam layer which is relatively thin as compared with the thickness of the backrest, the foam layer being covered with a covering material made of leather, of skin, of woven or nonwoven textile, of synthetic material, etc., defining the apparent surface of the rear panel.

An example of a seat backrest equipped with a rear panel of this type is described in document FR A 2941657.

SUMMARY

An embodiment overcomes all or part of the disadvantages of known techniques for forming a pocket in a motor vehicle cover element provided with a foam layer on its rear surface.

An embodiment provides a solution particularly adapted to the forming of a map pocket for a seat backrest.

An embodiment provides a solution for forming a pocket of a panel for the interior of a vehicle.

An embodiment provides a solution compatible with the use of a flexible element such as a net to form the front of the pocket.

Thus, an embodiment provides a map pocket for a motor vehicle cover element formed of a stack formed at least of a covering material made of textile, of leather, of skin, or of a synthetic material, and of a foam layer at the rear surface of the covering material, comprising:

a piece defining the apparent surface of the pocket;

elongated rigid elements at least partially surrounding said piece and sandwiching the cover element and said piece.

According to an embodiment, the elongated elements are U-shaped frames which leave free an upper edge of said piece.

According to an embodiment, the elongated elements are assembled to each other.

According to an embodiment, the piece defining the apparent surface is a net.

According to an embodiment, the piece defining the apparent surface is a piece of leather, of skin, of woven or nonwoven textile, or of a synthetic material.

According to an embodiment, the elongated elements located on the side of the motor vehicle seat element comprise tabs for fastening to a frame of the seat element.

According to an embodiment, all or part of the fastening tabs are removable.

An embodiment provides a cover element for a motor vehicle seat comprising:

a covering material made of textile, of leather, of skin, or of synthetic material;

a foam layer; and a map pocket.

An embodiment provides a seat element for a motor vehicle, comprising a cover element.

An embodiment provides a motor vehicle seat comprising at least one seat element.

BRIEF DESCRIPTION OF THE DRAWINGS

The foregoing and other features and advantages will be discussed in detail in the following non-limiting description of specific embodiments in connection with the accompanying drawings.

DETAILED DESCRIPTION

Figure 1:
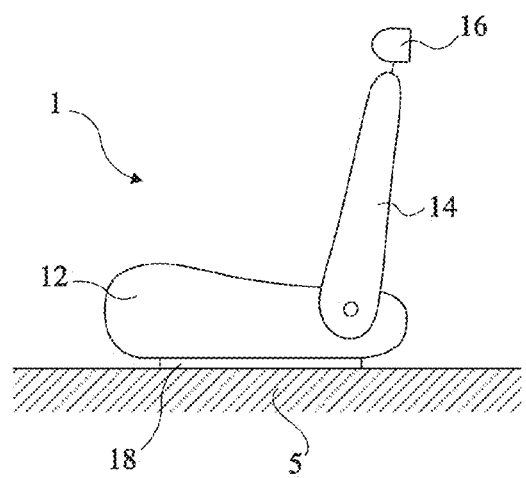
FIG. 1 is a simplified lateral view of a motor vehicle seat.

For clarity, only those steps and elements which are useful to the understanding of the described embodiments have been shown and will be detailed. In particular, the forming of the other seat elements has not been detailed, the described embodiments being compatible with any usual forming of upholstery attached to a frame.

It should be noted that, in the drawings, the structural and/or functional elements common to the different embodiments may be designated with the same reference numerals and may have identical structural, dimensional, and material properties.

In the following description, when reference is made to terms qualifying absolute positions, such as terms "front", "rear", "top", "bottom", "left", "right", etc., or relative positions, such as terms "above", "under", "upper", "lower", etc., or to terms qualifying directions, such as terms "horizontal", "vertical", etc., it is referred to the orientation of the drawings. Unless otherwise specified, expressions approximately, substantially, and in the order of mean to within 10%, preferably to within 5%.

FIG. 1 is a simplified lateral view of a motor vehicle seat 1. Such a seat comprises a seat bottom piece 12 having a backrest 14 jointed thereto and most often topped with a headrest 16. Seat bottom piece 12, backrest 14, and headrest 16 each comprise upholstery fastened to their frame, generally made of metal. The frame of seat bottom piece 12 may be connected to floor P of the vehicle by a slide rail mechanism 18. Seat 1 may also comprise one or a plurality of armrests (not shown).

Reference will be made hereafter to a rear panel of backrest 14 of seat 1. However, unless otherwise specified, all that will be described hereafter more generally applies to any cover element for which the same problems are posed and where a pocket is desired to be formed, for example, the lateral casings of the seat, a rear headrest panel, a door panel of the vehicle, etc.

Figure 2:
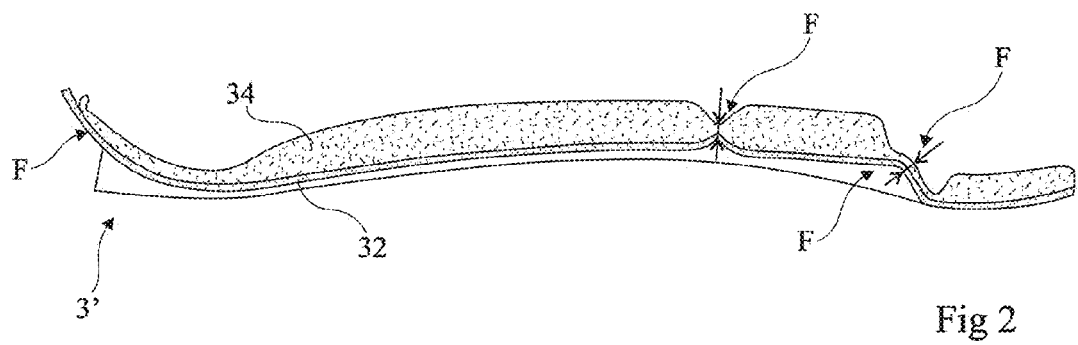
FIG. 2 is a cross-section view illustrating an embodiment of a rear panel of a seat backrest.

FIG. 2 is a cross-section view illustrating the forming of a rear panel 3 of a seat backrest of the type described in above-mentioned document FR-A-2941657.

Figure 3:
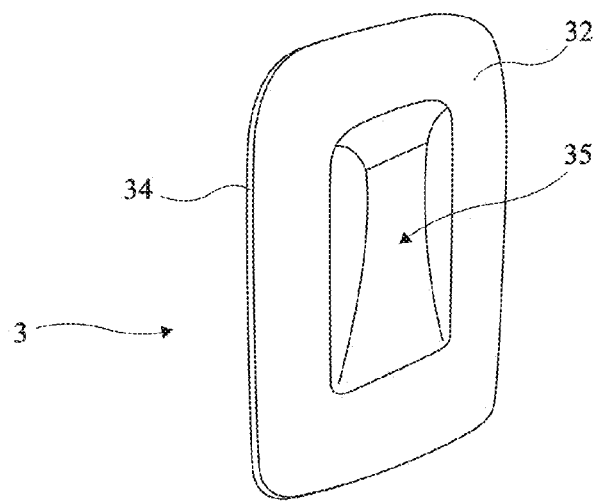
FIG. 3 is a perspective view illustrating an embodiment of a rear panel of a seat backrest.

FIG. 3 is a perspective view of rear panel 3.

Panel 3 is formed of a stack of a covering material 32, for example, made of textile (woven or not), of leather, of skin, or of a synthetic material, and of a foam layer 34. Panel 3 defines the final shape and the aspect of the rear side of the backrest (14, FIG. 1). In particular, foam layer 34 enables to give rear panel 3 a rigidity greater than that of the covering material. Further, the forming of foam layer 34 enables to vary the shape of the panel (for example, marks F), for example, in terms of thickness of foam layer 34, of curvature thereof, by forming areas recessed with respect to the apparent surface, particularly in a recessed central area 35 intended to form a map pocket. The optional recessed area provides additional comfort in terms of inhabitability for backseat passengers by providing additional space for the knees.

As compared with a plastic shell, the advantages of this technique are, among others, a weight gain, an assembly by sewing to the rest of the backrest cap, and an easy manufacturing. As compared with a stretched piece of covering material, the advantages are, among others, a space gain by enabling to follow at closest the metal structure of the backrest frame. Further, different foam hardnesses and/or densities may be provided in the rear panel, for example, according to areas. Cover element 3 thus defines not only the shape but also the finishing of the apparent surface of the cover element.

Figure 4:
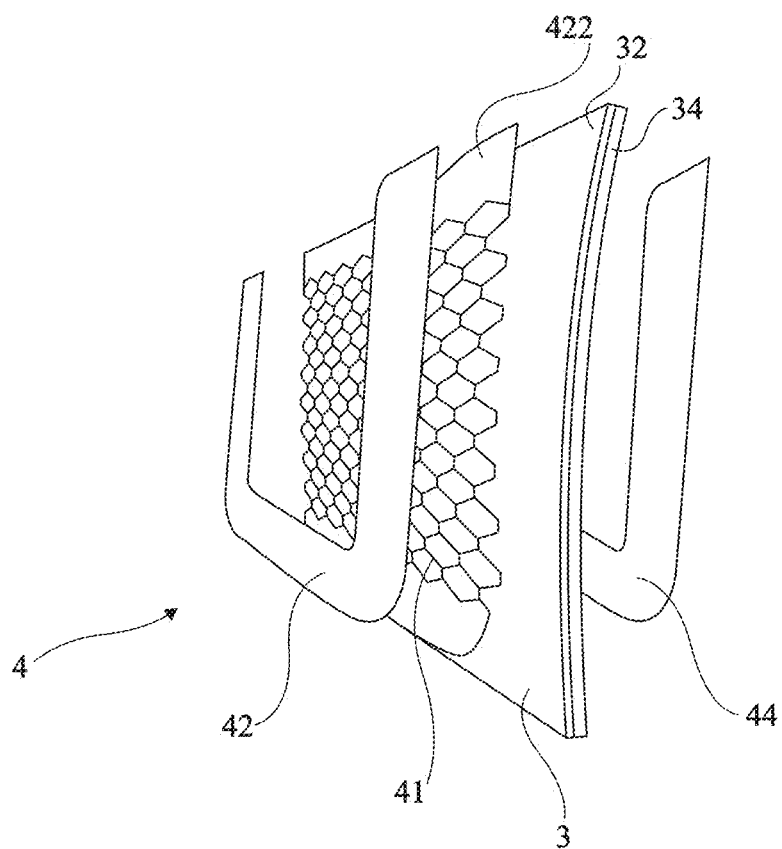
FIG. 4 is an exploded perspective view of an embodiment of a map pocket.

FIG. 4 is an exploded perspective view of a map pocket 4.

The back of pocket 4 is formed by cover element 3, for example, at the level of the central area (35, FIG. 3) of the rear panel of the backrest.

The front or apparent surface of pocket 4 is formed, in this example, of a piece 41 having an upper portion preferably comprising an elastic band 422. The piece is for example made of a net. As a variation, the apparent surface is formed of a piece of leather, of skin, of woven or nonwoven textile, or of a synthetic material. Although reference will be made hereafter to the example of a net, all that will be described applies to the other materials forming the piece defining the apparent surface.

A difficulty is to assemble the net to the rear panel. Indeed, in usual mesh pocket forming techniques, a rigid frame which is fastened to the rigid rear surface of the backrest is provided. In the targeted applications, the rear panel is generally not sufficiently rigid to accept such a fastening. In particular, the foam risks tearing.

Thus, according to the embodiment of FIG. 4, map pocket 4 further comprises an outer frame 42, U-shaped (open at the top) and a U-shaped inner frame 44 (also open at the top). Frames 42 and 44 are intended to sandwich rear panel 3 and the periphery of net 41 except for the upper portion thereof (band 422).

Frames 42 and 44 are preferably made of plastic material and are assembled to each other by point-like elements, for example, pins, crossing meshes of net 41 and crossing panel 3.

As a variation, internal frame 44 is complete. This however adds thickness in the upper portion.

According to another variation, only two lateral plates (vertical legs of the Us) and the bottom of the net is sewn to the rear panel. Indeed, the rear panels of the type to which the described embodiments apply are compatible with a sewing.

Thus, more generally, elongated rigid elements at last partially surrounding net 41 and sandwiching the cover element and the net are provided.

Figure 5A:
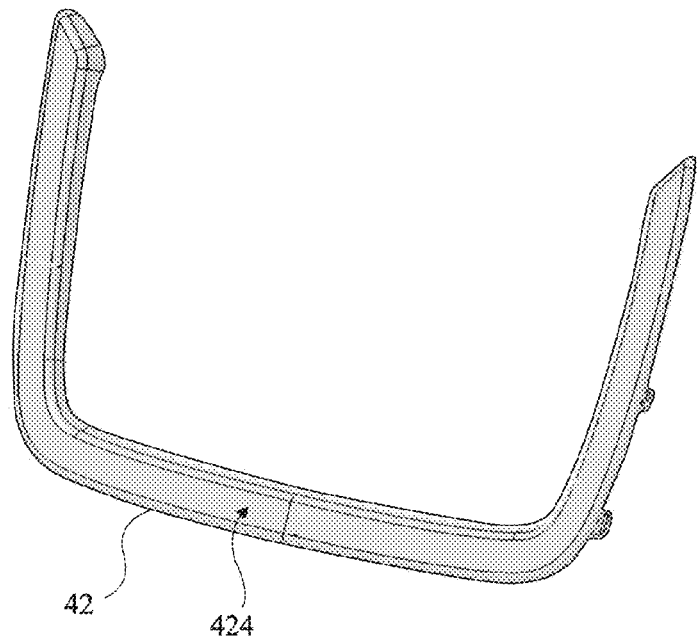
FIGS. 5A and 5B are perspective views, respectively external and internal of an outer frame of the pocket of FIG. 4.
Figure 5B:
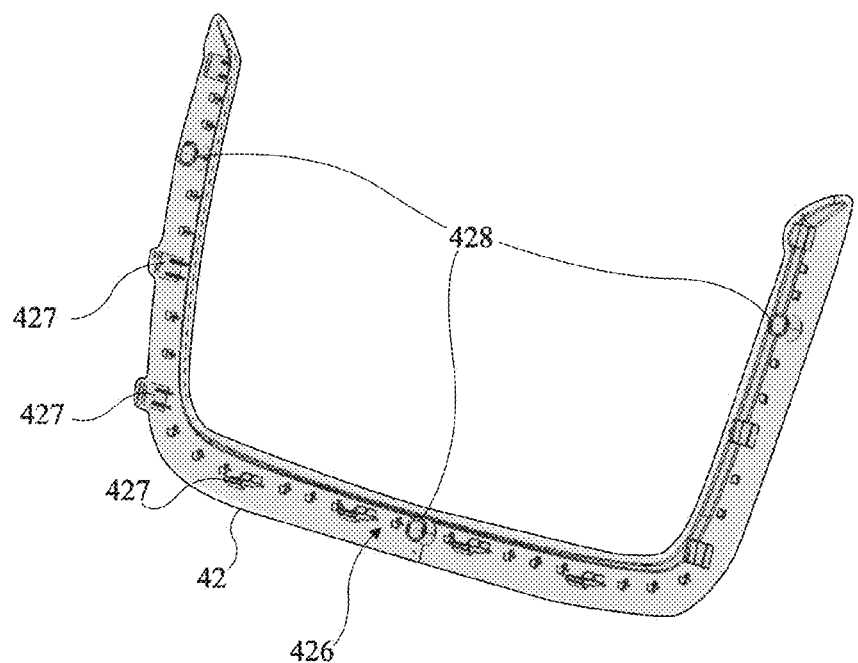

FIGS. 5A and 5B are perspective views, respectively external and internal, of outer frame 42 of the pocket of FIG. 4.

Figure 6A:
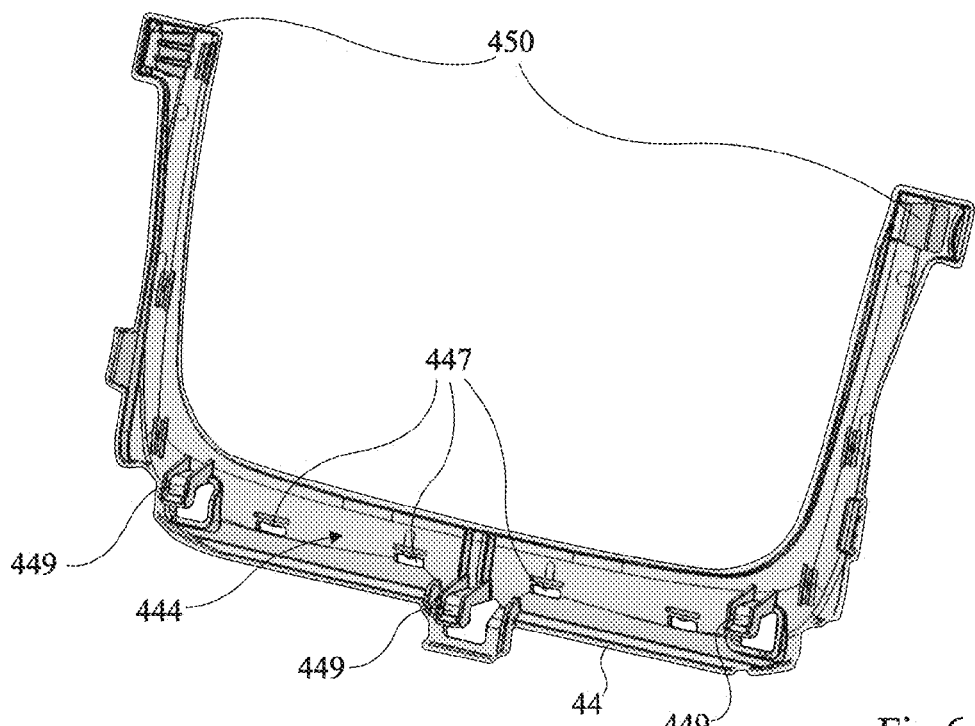
FIGS. 6A and 6B are perspective views, respectively external and internal of an inner frame of the pocket of FIG. 4.
Figure 6B:
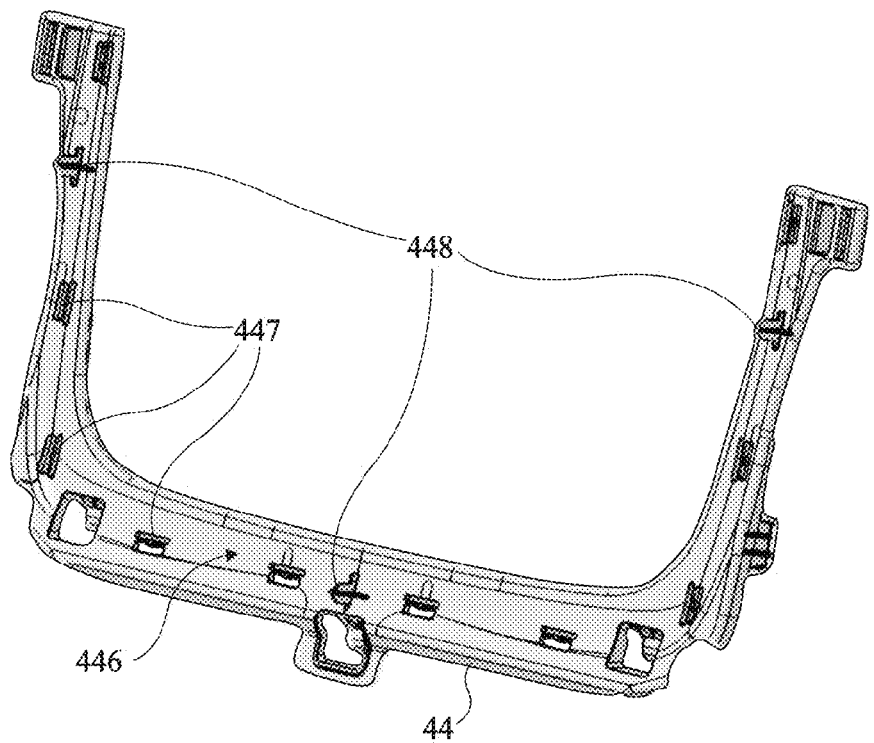

FIGS. 6A and 6B are perspective views, respectively external and internal, of inner frame 44 of the pocket of FIG. 4.

Outer surface 424 (FIG. 5A) of frame 42 forms the surface visible once map pocket 4 has been formed. Outer surface 424 is thus preferably smooth. Inner surface 426 (FIG. 5B) of frame 42 comprises protruding elements for fastening to the inner frame (FIGS. 6A and 6B).

In the example of FIG. 5B, point-like elements of snap tab type 427 intended to cooperate with ports 447 formed in internal frame 44 are provided. Tabs 427 are regularly distributed on the frame.

Alignment pins 448 protruding from inner surface 446 (FIG. 6B) of inner frame 44 are for example also provided. Pins 448 are intended to cooperate with corresponding shafts 428 protruding from inner surface 426 of outer frame 42.

Further, outer surface 444 (FIG. 6A) of inner frame 44 preferably comprises lower tabs 449 and/or upper tabs 450 for fastening to the frame (not shown) of the backrest. The holding of the map pocket is thus ensured.

According to an embodiment, tabs 449 and 450 form one piece with plastic frame 44.

According to another embodiment, tabs 450 and/or tabs 449 are removable to decrease the bulk when the pieces are transported from the manufacturing site to the assembly site. Tabs 449 and/or 450 are then assembled.

The shape of the tabs may vary. They may take the form of open-ring clips, etc. according to the shape of the frame area with which they are intended to cooperate.

Map pocket 4 is assembled flat one rear panel 3, once the latter has been formed. The panel is then either directly assembled to the back of the backrest, or assembled (sewn) to the rest of the backrest cap which is then slipped like a sock on the backrest frame.

As a variation, the frames are assembled by providing pins protruding from the inner surface of the outer frame and which cross the inner frame. The free end of the pins is then melted on the inner surface side of the inner frame to form, in a way, plastic rivets.

Embodiments have been described. Various alterations, modifications, and improvements will occur to those skilled in the art. In particular, although the embodiments have been described in relation with an example of a map pocket for a rear backrest panel, they more generally apply to any cover element which is desired to be fitted with a mesh pocket. Further, the practical implementation of the described embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A motor vehicle cover element having a map pocket, the cover element comprising a stack formed at least of a cover material made of textile, leather, skin, or a synthetic material, and of a foam layer at the rear surface of the cover material, the map pocket comprising:
 a piece defining the apparent surface of the pocket; and
 elongated rigid elements at least partially surrounding said piece and sandwiching the cover material and foam layer of the cover element and said piece, wherein the elongated rigid elements are U-shaped frames which leave free an upper edge of said piece.

2. The cover element of claim 1, wherein the elongated elements are assembled to each other.

3. The cover element of claim 1, wherein the piece defining the apparent surface is a net.

4. The cover element of claim 1, wherein the piece defining the apparent surface is a piece of leather, skin, woven or nonwoven textile, or a synthetic material.

5. The cover element of claim 1, wherein the elongated elements located on the side of the motor vehicle seat element comprise tabs for fastening to a frame of the seat element.

6. The cover element of claim 5, wherein all or part of the fastening tabs are removable.

7. A motor vehicle seat element, comprising the cover element of claim 1.

8. A motor vehicle seat comprising at least one seat element of claim 7.

* * * * *